United States Patent
Hassani et al.

(10) Patent No.: US 11,563,732 B2
(45) Date of Patent: Jan. 24, 2023

(54) SYSTEMS AND METHODS OF MULTIPLE PARTY AUTHENTICATION IN AUTONOMOUS VEHICLES

(71) Applicant: Ford Global Technologies, LLC, Dearborn, MI (US)

(72) Inventors: Ali Hassani, Ann Arbor, MI (US); Hamid M. Golgiri, Livonia, MI (US); Michael Hand, Ypsilanti, MI (US); Shubham Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 669 days.

(21) Appl. No.: 16/589,795

(22) Filed: Oct. 1, 2019

(65) Prior Publication Data

US 2021/0099439 A1 Apr. 1, 2021

(51) Int. Cl.
*G06Q 10/02* (2012.01)
*H04L 9/40* (2022.01)
*G05D 1/00* (2006.01)

(52) U.S. Cl.
CPC .......... *H04L 63/083* (2013.01); *G06Q 10/02* (2013.01); *G05D 1/0088* (2013.01); *G05D 2201/0212* (2013.01); *G05D 2201/0213* (2013.01)

(58) Field of Classification Search
CPC .... H04L 63/083; G06Q 10/02; G05D 1/0088; G05D 2201/0212; G05D 2201/0213
See application file for complete search history.

(56) References Cited

U.S. PATENT DOCUMENTS

| | | | |
|---|---|---|---|
| 9,194,168 B1* | 11/2015 | Lu | G01C 21/26 |
| 9,805,605 B2* | 10/2017 | Ramanujam | G06Q 10/00 |
| 2016/0301698 A1* | 10/2016 | Katara | G06F 16/9554 |
| 2017/0132540 A1* | 5/2017 | Haparnas | G06Q 10/1093 |
| 2017/0349184 A1* | 12/2017 | Tzirkel-Hancock | G06F 3/167 |
| 2018/0075565 A1* | 3/2018 | Myers | G05D 1/0088 |
| 2020/0010051 A1* | 1/2020 | Dumov | G06V 40/172 |

OTHER PUBLICATIONS

"Glenn Le Santo, CES 2018: On the road to the autonomous car Web page <https://www.orange-business.com/en/blogs/CES-2018-on-the-road-to-the-autonomous-car>", 3 pages, retrieved from the internet on Apr. 9, 2019.

* cited by examiner

*Primary Examiner* — Thomas D Alunkal
(74) *Attorney, Agent, or Firm* — Brandon Hicks; Eversheds Sutherland (US) LLP

(57) ABSTRACT

Systems and methods comprising onboarding a plurality of parties into an autonomous vehicle; displaying in the autonomous vehicle one or more authentication protocols; receiving an authentication confirmation from each of the plurality of parties in response to the one or more authentication protocols; and communicating an authentication confirmation status of the presence of the plurality of parties to a transportation vehicle functions (TVF) manager associated with the autonomous vehicle.

20 Claims, 3 Drawing Sheets

SYSTEMS AND METHODS OF MULTIPLE PARTY AUTHENTICATION IN AUTONOMOUS VEHICLES

TECHNICAL FIELD

The present disclosure relates to multiple party authentication in autonomous vehicles and more particularly to an authentication manager configured to authenticate the statuses of a plurality of parties entering an autonomous vehicle.

BACKGROUND

Transportation systems are becoming increasingly more reliant on ride-sharing services where vehicles are assigned to transport passengers between two or more waypoints. Ride-sharing services are made more cost effective through multi-party usage. More specifically, optimizing capacity of vehicles for multi-party transport can reduce operating expenses, vehicle down time from unoccupancy, and roadway traffic. However, simultaneous multi-party usage of vehicles may create issues with party authentication, particularly when multiple parties are onboarding into a vehicle simultaneously or at a same waypoint. Similarly, multi-party usage may present issues where a later onboarding party arrives at the vehicle and the already-boarded party opens the door for the later onboarding party or already had the door open upon arrival of the later onboarding party. Particularly for autonomous vehicles, where a dedicated human driver is not present in the vehicle, issues can arise where a first party authenticates their presence in the vehicle but additional parties arriving at the vehicle access the vehicle without authenticating their presence. For example, a first party may leave the door of the vehicle open for a second party. Another example might occur where two parties enter the vehicle simultaneously. In such instances, the autonomous vehicle may not be able to detect the presence of multiple parties, particularly where one or more of the parties include multiple passengers. Moreover, traditional cabin scans and methods of identifying the presence of occupants in an autonomous vehicle may not be suitable where party numbers change after requesting transport but the new party number is not communicated in time to the vehicle.

There exists a need for improved multi-party recognition and management, particularly for autonomous vehicles.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to authenticate the statuses of a plurality of parties entering an autonomous vehicle at a same or similar waypoint or where a previously authenticated party permits vehicle access to a successively boarding party without authentication being required by the successively boarding party. Traditionally, authenticating multiple party onboarding events is difficult for autonomous vehicles as there is no human operator onboard to visually and audibly detect the presence of all parties at the vehicle. One or more systems and methods described herein leverage an authentication manager (AM) in communication with a transportation-as-a-service (TaaS) Vehicle Function (TVF) manager associated with the autonomous vehicle. The AM may notify the TVF of party status (e.g., arrival in the vehicle) to permit passenger-authenticated operation of the autonomous vehicle, such as transportation to one or more destination waypoints.

In one embodiment, the present disclosure leverages a user interface disposed within or on the autonomous vehicle. The user interface can include a touch screen, a keypad, or a combination thereof. The user interface may be configured to display one or more authentication protocols to a plurality of parties on-boarded (or to be on-boarded) in the autonomous vehicle at a same or similar waypoint. The user interface may be further configured to receive an authentication confirmation from each of the plurality of parties in response to the one or more authentication protocols. In one exemplary embodiment, the one or more authentication protocols can include a party status indicator identifying which parties remain unauthenticated. The one or more authentication protocols can include an area for the parties to authenticate their presence in the vehicle. Upon authenticating onboarding, the AM may communicate successful authentication to the TVF to permit autonomous vehicle operation. These and other benefits of the disclosure will be described in greater detail below.

Illustrative Embodiments

Figure 1:
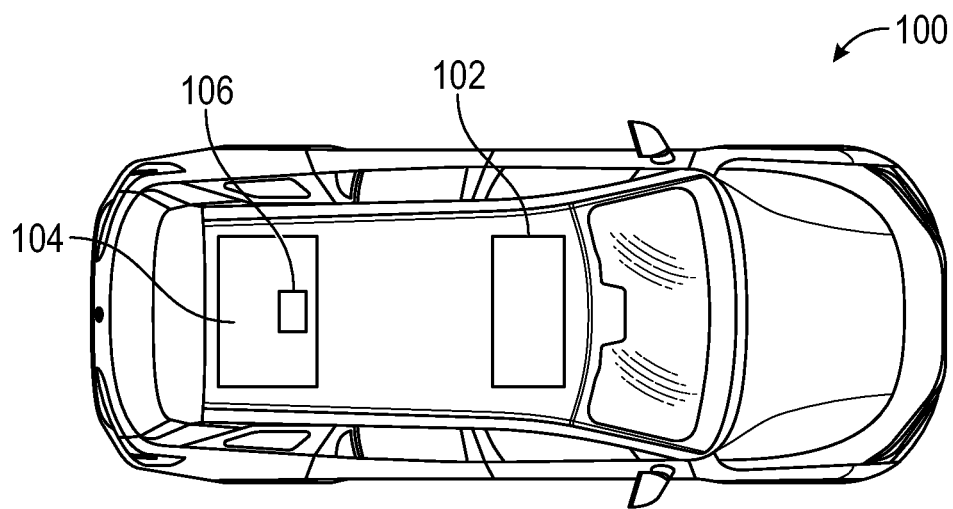
FIG. 1 depicts an illustrative view of an autonomous vehicle in accordance with an embodiment.

Turning now to the drawings, FIG. 1 depicts an illustrative view of an autonomous vehicle 100 including a Transportation as a Service (TaaS) Vehicle Function (TVF) manager 102 and an Authentication Manager (AM) 104. The TVF 102 can provide an automated driver system with coordinates of the location where the autonomous vehicle 100 needs to drive to. The TVF 102 can further handle non-driving responsibilities that may otherwise be handled by a human driver in non-autonomous vehicles. The TVF 102 and AM 104 may include modules in one or more computing devices comprising one or more memories and processors configured to execute computer readable instructions as outlined herein.

The AM 104 may be configured to authenticate the statuses of a plurality of parties entering the autonomous vehicle 100. In one embodiment, the AM 104 can be configured to authenticate the successful onboarding of a plurality of parties entering the autonomous vehicle 100 at a same or generally same time, such as at a same onboarding location. In another embodiment, the AM 104 can be configured to authenticate successively onboarding parties in instances where authentication may not otherwise occur. Without use of the AM 104, multiple parties might enter the autonomous vehicle 100 without authenticating their individual onboarding status, leaving the autonomous vehicle 100 in need of assistance to successfully detect the onboarding event. Traditionally, when onboarding a single party into the autonomous vehicle 100, that party must authenticate their status to unlock or otherwise access the vehicle. However, when multiple parties onboard simultaneously or the door to the vehicle is otherwise left open for a successively onboarding party, unique authentication may not occur. For instance, a first party may authenticate their status to open or unlock the autonomous vehicle and leave the door open for a second party onboarding the autonomous vehicle 100 at the same waypoint. Alternatively, a first party may open a door of the vehicle which may permit unauthenticated vehicle access to a second party. Since the second party is not required to authenticate their status in order to unlock or access the autonomous vehicle 100, issue may arise with authentication of successful onboarding of the second party. Specifically, in certain instances it may be difficult or impossible to differentiate between multiple present parties when less than all parties are successfully authenticated. In other instances, it may be difficult to authenticate parties when one or more parties brings additional passengers. In yet further instances, it may be difficult to assign an appropriate route when a party fails to show up to the autonomous vehicle 100 and their drop-off location must be removed. In this regard, the AM 104 may require authentication of the second or further additional party to complete the multiple party onboarding event and permit transportation services. Upon authenticating the successful onboarding of all parties, the AM 104 can communicate an authentication confirmation status to the TVF 102 which may then communicate with the automated driver system to operate the autonomous vehicle 100 and transport the parties to their respective drop-off locations.

In an embodiment, the AM 104 can include processing circuitry. In one embodiment, the AM 104 can be disposed locally within the autonomous vehicle 100. The AM 104 may be discrete from the TVF 102, such as a separate operating hardware contained in or on the autonomous vehicle 100. In an embodiment, the AM 104 can include a user interface 106, such as a touch screen, user entry keypad or keyboard, or another user interactive interface configured to receive input from an onboarding party of their arrival at the autonomous vehicle 100. In one embodiment, the user interface 106 can be disposed within an interior of the autonomous vehicle 100. For instance, the user interface 106 can be disposed on a wall or headboard of the autonomous vehicle 100 or within seating or components of the autonomous vehicle 100. In another embodiment, the user interface 106 can be at least partially disposed at or along an external location of the autonomous vehicle 100. For example, the user interface 106 may include a keypad disposed at or adjacent to a door of the autonomous vehicle 100. In certain embodiments, the user interface 106 can have some components disposed within the autonomous vehicle 100 and other components disposed outside of the autonomous vehicle 100. The multiple interfaces can operate in sync to detect party onboarding both within and external to the autonomous vehicle 100.

In an embodiment, the TVF 102 or another autonomous vehicle subsystem may perform interior checks to determine seat occupancy within the autonomous vehicle 100. Such interior checks can include optical scans, weight detection, or other similar scanning elements or methods configured to detect the presence of one or more passengers within the autonomous vehicle 100. The use of interior checks may be useful in instances, for example, where one or more of the parties to receive transportation via the autonomous vehicle 100 change the number of passengers in their party after arranging the ride. By way of non-limiting example, a first party may request transportation for three individuals and a second party may request transportation for two individuals. If the autonomous vehicle has six seats, there may initially be an additional seat available for a third party with only one passenger. However, if one of the first or second parties arrives at the autonomous vehicle 100 with an additional passenger (e.g., the first party arrives with four passengers or the second party arrives with three passengers), the use of interior checks may notify the TVF that the presumed open seat is now occupied and the autonomous vehicle 100 cannot accept the additional third party without first offloading one or both of the first and second parties. As described in greater detail below, the autonomous vehicle 100 may include an input option for onboarding parties to edit the number of passengers contained in their party. Such input option may be included, for instance, in the user interface 106 of the AM 104. The input option may permit an entering party to modify their party passenger count to add one or more additional passengers or remove one or more existing passengers from the party's passenger count to provide the accurate passenger count associated with a particular party.

In certain instances, the autonomous vehicle 100 may incur an intermediary stop between currently assigned waypoints. The intermediary stop can include, for instance, picking up an additional party for transport. In an embodiment, the TVF 102 may request the AM 104 to verify the status of all on-boarded parties at the intermediary stop. If phones associated with the parties are localized within the autonomous vehicle 100, no additional processing may be required. In instances where a party verified their status with a human user interface (HMI), checks for parties within the vehicle may be performed using interior cameras and seat sensors to verify the members of a party did not change seat position. In an embodiment, the autonomous vehicle 100 can present multi-party authentication through HMI on interior displays, exterior displays, or both to check for party presence at the intermediary stop. The multi-party authentication can be performed when checks of the vehicle return invalid or in addition to the vehicle checks.

Figure 2:
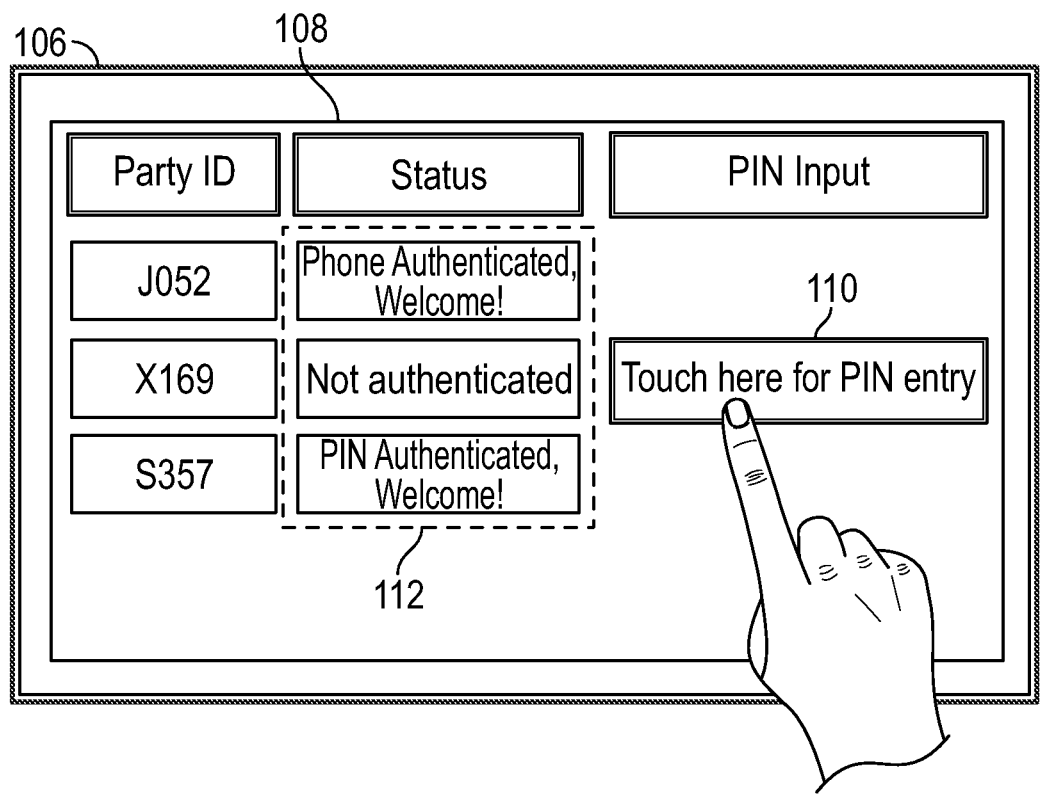
FIGS. 2 and 3 depict exemplary views of a user interface disposed within the autonomous vehicle in accordance with an embodiment.

FIG. 2 illustrates an exemplary user interface 106 configured to display one or more authentication protocols 108 and receive an authentication confirmation 110 of the presence of each of the plurality of parties in response to the authentic protocols 108. In one embodiment, the one or more authentication protocols 108 can include a status area 112 depicting the current status of the parties associated with transportation needs in the autonomous vehicle 100. In the illustrated embodiment, the status area 112 depicts successful authentication of two parties (e.g., Party IDs J052 and S357) and one non-authenticated party (e.g., Party ID X169). Parties yet to authenticate their successful onboarding status may be highlighted on the user interface 106 through the use of different colors, shapes, or one or more other characteristics as compared to parties that have already successfully authenticated their on-boarded status. In the illustrated embodiment, Party ID X169's non-authentication status is indicated with orange shading to alert the passengers that the party associated with Party ID X169 is not yet authenticated.

Successful authentication may be performed on the user interface 106 or through another method, such as through a smart device. Authentication via a smart device may be performed easily in areas with good cellular reception. However, in areas with poor cellular reception, it may be necessary for parties to manually authenticate their successful on-boarded status using the user interface 106. In the illustrated embodiment, Party ID J052 is described as having been authenticated through the use of a smart device. Specifically, Party ID J052 was authenticated using a phone. Meanwhile, Party ID S357 is described as having been authenticated through the use of a PIN authentication (described in greater detail below).

Figure 3:
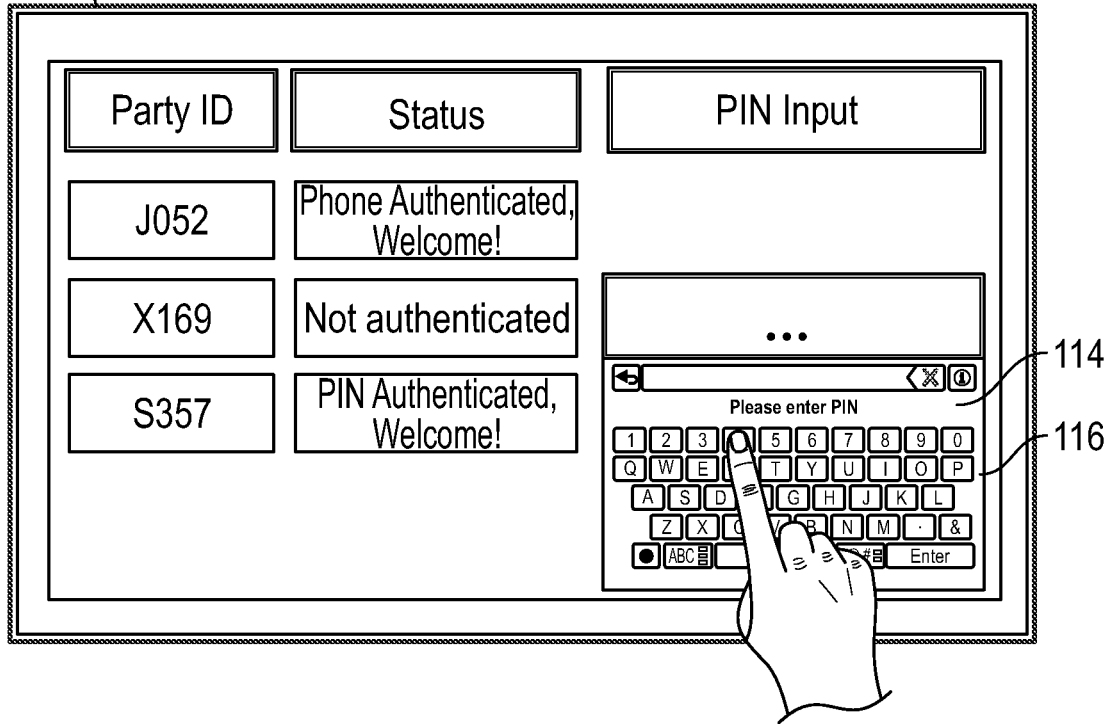
Figure 4:
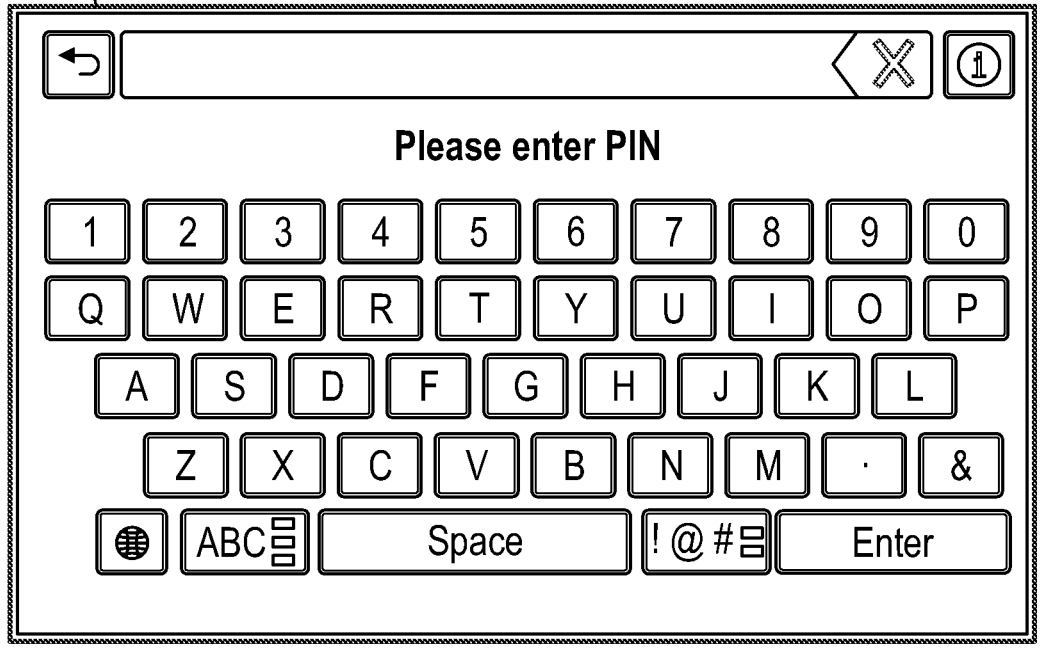
FIG. 4 depicts an enlarged view of the user interface of FIG. 3 in accordance with an embodiment.

FIG. 3 illustrates the user interface 106 after a party (e.g., PartyID X169) selects their authentication confirmation 110 (FIG. 2). In response to selecting the authentication confirmation 110, the user display 106 may display an input area 114 for entry of a unique password or code associated with the authenticating party. In the illustrated embodiment, the input area 114 includes a digital keyboard 116 where the authenticating party may enter a password received prior to onboarding. In an embodiment, the keyboard 116 may be displayed on the user interface 106. In another embodiment, the keyboard may be part of a discrete keyboard or keypad in communication with the user interface 106. FIG. 4 illustrates an enlarged view of an exemplary keyboard 116 that may be displayed on the user interface 106. The keyboard 116 may include numerals, letters, characters, and other operational and functional elements to permit successful user entry of their password or code.

In one example embodiment, the party may receive their password via a smart device associated with the authenticating party upon requesting a ride from the autonomous vehicle. Alternatively, the password may be provided to the authenticating party at some other time between requesting the ride and entering the autonomous vehicle 100. In one embodiment, the password may include an alphanumeric password or PIN. The authenticating party can enter the received password to authenticate their on-boarded status.

Upon successful authentication, the user interface 106 may change the status of the previously unauthenticated party to indicate successful authentication. The AM 104 may further communicate the successful authentication to the TVF 102 to permit vehicle transit to a first waypoint destination.

Figure 5:
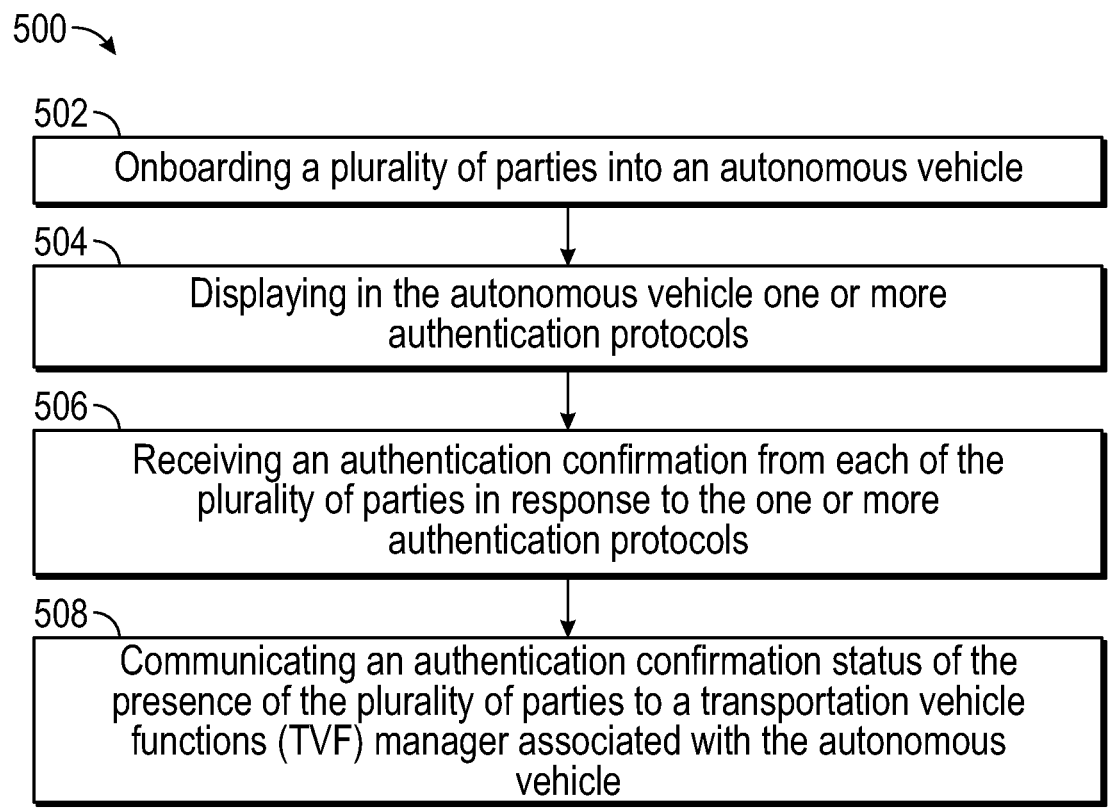
FIG. 5 includes a flow chart of a method of multiple party authentication in an autonomous vehicle.

FIG. 5 illustrates a flow chart of a method 500 of multiple party authentication in an autonomous vehicle. In one embodiment, the method 500 includes onboarding 502 a plurality of parties into the autonomous vehicle. In an embodiment, onboarding 502 can occur at a same, or generally same time, such as at a same waypoint. In another embodiment, onboarding 502 at a single waypoint can include instances where multiple parties enter the autonomous vehicle without individual need of authentication to unlock or access the autonomous vehicle. That is, methods 500 of multiple party authentication may be required in instances where individual party authentication is not required for all parties to access the autonomous vehicle. For instance, a second party may enter the autonomous vehicle without authenticating arrival if a first party leaves the door open or reopens the door for the second party. By way of another example, a member of the first party may temporarily exit the vehicle at a waypoint where a second party is to be onboarded. If the second party arrives while the vehicle door is open, the second party may not be required to authenticate arrival to access the autonomous vehicle.

The method 500 can further include displaying 504 in the autonomous vehicle one or more authentication protocols. The authentication protocols can be displayed inside the autonomous vehicle, outside of the autonomous vehicle, or both. The authentication protocols can indicate to the onboarding parties a request for authentication. The authentication protocols can further include instructions or actions for the onboarding party to authenticate their on-boarded status.

In certain instances, one or more of the plurality of parties may not successfully authenticate their status. This may occur, for example, if the party is not present in or at the autonomous vehicle or not attentive to the requested authentication. In such instances, the autonomous vehicle can generate an alert to the unauthenticated party. The alert can include, for example, a visual alert, an audible alert, a tactile alert, other types of alerts, or any combination thereof. In certain embodiments, the alert can have variable intensity, such as increasing intensity over time. That is, for example, the initial alert can include a low intensity notification to the party. Over time, the alert can grow in intensity. For example, the alert can get louder, brighter, or harsher in order to more easily garner the attention of one or more missing or unauthenticated parties.

In an embodiment, the method 500 can further include receiving 506 an authentication confirmation from each of the plurality of parties in response to the one or more authentication protocols. In certain instances, the parties may enter unique passwords or codes into one or more user interfaces to authenticate status. In a particular embodiment, the user interface can include a touch screen configured to display alphanumeric and other characters for the party to enter their password.

In an embodiment, the method 500 can further include communicating 508 an authentication confirmation status of the presence of the plurality of parties to the TaaS vehicle functions (TVF) manager associated with the autonomous vehicle. In certain instances, communicating 508 the presence of the plurality of parties may allow the TVF to perform onboarding checks and, once onboarding checks are complete, request the party to provide confirmation to allow the autonomous vehicle to shift the car into drive. Once confirmation is provided and the autonomous vehicle is ready to drive, the TVF can request the automated driving system to perform the task of driving to the drop-off location as provided by the TVF.

In one embodiment, the autonomous vehicle can further generate updates for associated smart devices, such as user devices of the one or more parties to onboard into the autonomous vehicle. In a particular embodiment, the TVF can generate the updates. The updates can correspond with updates to the autonomous vehicle, one or more parties, or both. For example, the updates can inform one or more of the parties that the autonomous vehicle has arrived at a pickup waypoint, has departed from a waypoint, is in route to a waypoint, is awaiting party onboarding, is no longer scheduled for pickup, maintenance is required, or any other relevant update for the party. In certain embodiments, the updates can be sent to only those user devices for which notification of the update is necessary. That is, the update can be sent to only one or a few of the parties associated with a transportation scenario.

In an embodiment, the TVF can communicate expected on-boarding party trip IDs to the AM. In one embodiment, the autonomous vehicle can be configured to update its location or status with parties to be on-boarded for a finite duration of time before arrival. The finite duration can occur, for example, for 10 seconds, 15 seconds, or 30 seconds. Moreover, the updates may cease after departure. In such a manner, security of the autonomous vehicle, parties associated therewith, or both can be better maintained to avoid incidents and issues. In an embodiment, the AM can keep the keys associated with the trip IDs inactive. Upon receiving the on-boarding status from the TVF, the AM can activate the keys associated with the trip IDs. The AM can further engage appropriate key verification systems and associated human-machine-interfaces (HMIs), such as phone connection requests, phone localization, keypad HMIs, etc.

In certain embodiments, party location as monitored by a smart device associated with the party, can be maintained continuously throughout the duration the smart device is connected with the autonomous vehicle. The determined locations may be either reported to the AM upon location changes or after the AM receives an authentication challenge from another module of the vehicle when unlock and departure are made. The AM can then report the location of all known parties throughout the duration of the ride. The AM may particularly report the location of all known parties during boarding operations.

In certain instances, the AM may be configured to receive authentication, or a pared down version thereof, from smart devices in an area associated with the autonomous vehicle. For example, when a party approaches the vehicle, the AM may receive authentication therefrom. The AM may notify the TVF of the approaching party which can then unlock the vehicle. In certain instances, the AM may further request authentication at the user interface. In other instances, the AM may authenticate the party upon notification of the approaching party to the vehicle. As previously described, such interaction between the autonomous vehicle and smart device may not be available in all areas as cellular reception may not be strong enough. Thus, in certain instances, authentication protocol can vary.

In an embodiment, the TVF can inform the AM of a party trip ID off-boarding list at the destination of each ride. The party trip ID off-boarding list may be independent of any simultaneous or similar pickup time. The off-boarding party may be allowed access to the autonomous vehicle during off-boarding. Access to the autonomous vehicle can be terminated to the off-boarding party, for example, upon locking the doors of the autonomous vehicle either through a lock request or a timeout period. In an embodiment, the off-boarding party may be allowed to re-authenticate their presence at the vehicle, for example to collect forgotten luggage, as long as the timeout period has not expired. The autonomous vehicle can then depart after the TVF determines the party completed off-boarding. Such determination may occur either via timeout or upon successful confirmation with an HMI (e.g., a mobile app or utilization of one or more interior and exterior displays).

This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below is presented for the purposes of illustration and is not intended to be exhaustive or to be limited to the precise form disclosed. Alternate implementations may be used in any combination desired to form additional hybrid implementations of the present disclosure.

Device characteristics described with respect to one feature of the present disclosure may provide similar functionality in other devices. For example, any of the functionality described with respect to a particular component such as a first processor in a first computer may be performed by another component such as a second processor in another computer. Further, although embodiments have been described in language specific to structural features and/or methodological acts, it is to be understood that the disclosure is not necessarily limited to the specific features or acts described.

In the above disclosure, reference is been made to the accompanying drawings that illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described. Certain words and terms are used herein solely for convenience and such words and terms should be interpreted as referring to various objects and actions that are generally understood in various forms and equivalencies by persons of ordinary skill in the art.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not intended to imply that features, elements, and/or steps are in any way required for one or more embodiments.

It is anticipated and intended that future developments will occur in the technologies discussed herein, and that the disclosed systems and methods will be incorporated into such future embodiments. In sum, it should be understood that the application is capable of modification and variation.

That which is claimed is:

1. A method, comprising:
   receiving information associated with a plurality of parties comprising at least a first party and a second party;
   determining, based on the information, an expected count of passengers for the plurality of parties;
   on-boarding the plurality of parties into an autonomous vehicle without requiring the plurality of parties to provide authentication prior to accessing the autonomous vehicle;
   displaying, in the autonomous vehicle, one or more authentication protocols;
   receiving an authentication confirmation from each of the plurality of parties in response to the one or more authentication protocols;
   communicating an authentication confirmation status of a presence of the plurality of parties to a transportation vehicle functions (TVF) manager associated with the autonomous vehicle;
   determining, based on the authentication confirmation status from each of the plurality of parties, that an actual count of passengers different from the expected count of passengers; and
   determining, based on the actual count of passengers, whether the autonomous vehicle has capacity to receive a third party.

2. The method of claim 1, wherein the plurality of parties each comprise at least one passenger.

3. The method of claim 1, wherein displaying the one or more authentication protocols is performed in an interior of the autonomous vehicle.

4. The method of claim 1, further comprising displaying within the autonomous vehicle a status of each of the plurality of parties.

5. The method of claim 4, wherein displaying the status and receiving authentication confirmation of each of the plurality of parties are performed on a same interface.

6. The method of claim 1, wherein receiving authentication confirmation comprises receiving a unique identifier from each of the plurality of parties.

7. The method of claim 1, wherein the plurality of parties are onboarded into the autonomous vehicle at a same waypoint.

8. The method of claim 1, further comprising generating an alert to one or more unauthenticated parties of the plurality of parties after a duration of time from displaying the authentication protocols.

9. An autonomous vehicle, comprising:
   an authentication manager (AM) comprising a user interface, wherein the AM is configured to authenticate the statuses of a plurality of parties entering the autonomous vehicle, and wherein the AM is configured to communicate the statuses of the plurality of parties to a transportation as a service (TaaS) vehicle functions TVF system, further wherein the plurality of parties comprises at least a first party and a second party and the TVF manager is configured to determine, based on the statuses of the plurality of parties, that an actual count of passengers is different from an expected count of passenger and to determine, based on the actual count of passengers, whether the autonomous vehicle has capacity to on-board an additional party.

10. The autonomous vehicle of claim 9, wherein the AM is configured to authenticate the presence of the plurality of parties.

11. The autonomous vehicle of claim 9, wherein at least a portion of the user interface is disposed in an interior of the autonomous vehicle.

12. The autonomous vehicle of claim 9, wherein the TVF manager is configured to generate a prompt that party authentication is required when an expected party is not yet authenticated by the AM.

13. The autonomous vehicle of claim 9, wherein the user interface is configured to receive a PIN entry from the parties entering the autonomous vehicle.

14. An authentication manager for an autonomous vehicle comprising:
   a user interface configured to:
      display one or more authentication protocols to a plurality of parties onboarded in the autonomous vehicle; and
      receive an authentication confirmation from each of the plurality of parties in response to the one or more authentication protocols; and
   processing circuitry configured to communicate an authentication confirmation status of the presence of the plurality of parties to a transportation vehicle functions (TVF) manager associated with the autonomous vehicle that determines, based on the authentication confirmation, that an actual count of passengers different from an expected count of passengers and to determine, based on the actual count of passengers, whether the autonomous vehicle has capacity to on-board an additional party.

15. The authentication manager of claim 14, wherein the user interface is disposed within the autonomous vehicle.

16. The authentication manager of claim 14, wherein the user interface is configured to display a status of each of the plurality of parties.

17. The authentication manager of claim 14, wherein the user interface is configured to receive a unique identifier from each of the plurality of parties.

18. The authentication manager of claim 14, wherein the authentication manager is further configured to accept a passenger number modification of at least one of the parties of the plurality of parties and communicate the passenger number modification to the TVF.

19. The authentication manager of claim 14, wherein the authentication manager is further configured to notify a user device associated with at least one of the plurality of parties upon a status change of the autonomous vehicle.

20. The authentication manager of claim 14, wherein the authentication manager is configured to generate an alert to unauthenticated parties of the plurality of parties after a duration of time.

* * * * *